United States Patent [19]

Longoni

[11] 4,153,332

[45] May 8, 1979

[54] SHEATHED OPTICAL FIBER ELEMENT AND CABLE

[75] Inventor: Sergio Longoni, Milan, Italy

[73] Assignee: Industrie Pirelli Societa per Azioni, Milan, Italy

[21] Appl. No.: 583,780

[22] Filed: Jun. 4, 1975

[30] Foreign Application Priority Data

Jul. 30, 1974 [IT] Italy ............................. 25702 A/74
Mar. 12, 1975 [IT] Italy ............................. 21154 A/75

[51] Int. Cl.² .............................................. G02B 5/14
[52] U.S. Cl. ........................... 350/96.23; 350/96.24; 350/96.30
[58] Field of Search .............. 350/96 B, 96 BC, 96 R, 350/96 WG, 96 BR

[56] References Cited

U.S. PATENT DOCUMENTS

| | | | |
|---|---|---|---|
| 2,434,793 | 1/1948 | Feaster | 174/69 X |
| 3,050,907 | 8/1962 | Hicks et al. | 350/96 BC X |
| 3,699,950 | 10/1972 | Humphrey et al. | 350/96 C X |
| 3,718,515 | 2/1973 | Goldstein | 350/96 B X |
| 3,817,595 | 6/1974 | Edelman et al. | 350/96 B X |
| 3,847,483 | 11/1974 | Shaw et al. | 350/96 B X |
| 3,865,466 | 2/1975 | Slaughter | 350/96 B |
| 3,883,218 | 5/1975 | Slaughter | 350/96 B |
| 3,920,980 | 11/1975 | Nath | 350/96 R X |
| 3,937,559 | 2/1976 | Ferrentino et al. | 350/96 B X |
| 3,955,878 | 5/1976 | Nowak | 350/96 B X |

*Primary Examiner*—John K. Corbin
*Assistant Examiner*—John D. Lee
*Attorney, Agent, or Firm*—Brooks, Haidt, Haffner & Delahunty

[57] ABSTRACT

One or more optical fibers are loosely enclosed in a tubular plastic sheath so as to be slidable with respect to the sheath. The fibers may be longer than the length of the corresponding surrounding sheath. The sheathed fibers are wound around a core and covered with a further sheath to form a cable. In the process, the optical fiber is treated with an anti-adhesive material before the sheath is extruded thereover and during the subsequent processing the sheath, which has a length greater than the length of the enclosed fiber, either because of its temperature or because of mechanical stretching, is allowed to contract while in non-slidable relation with the fiber, thereby providing a fiber length greater than that of the sheath.

13 Claims, 4 Drawing Figures

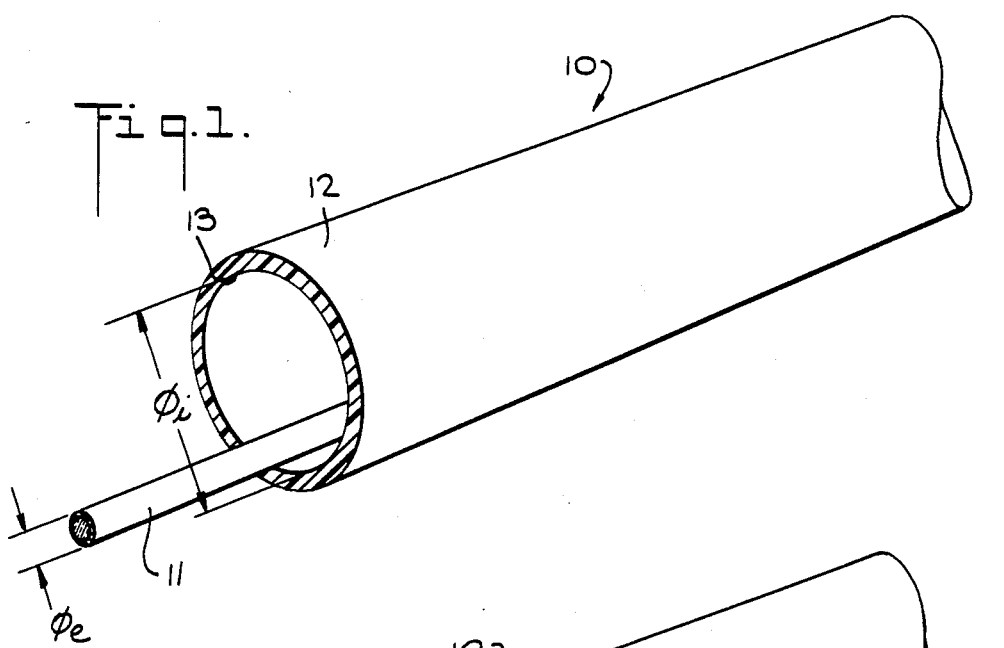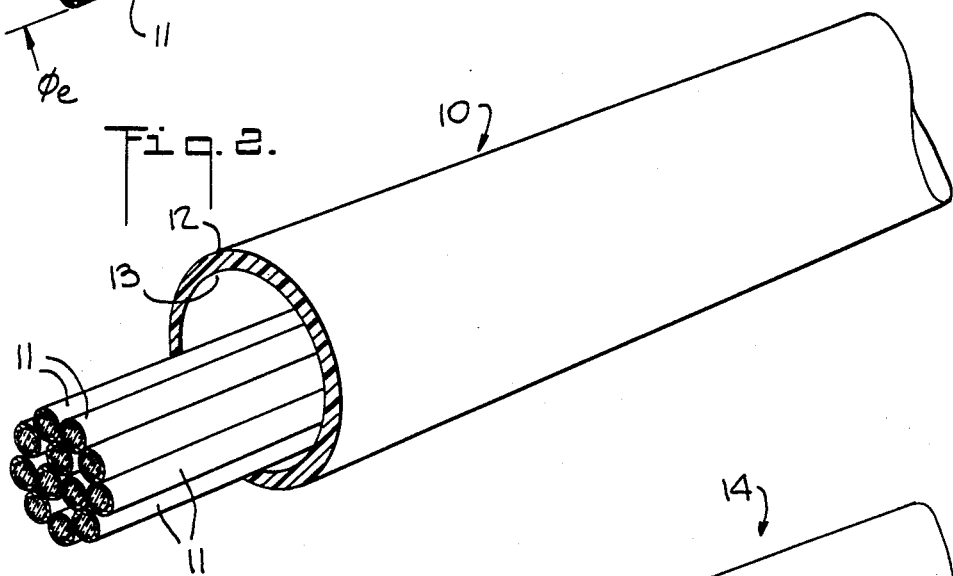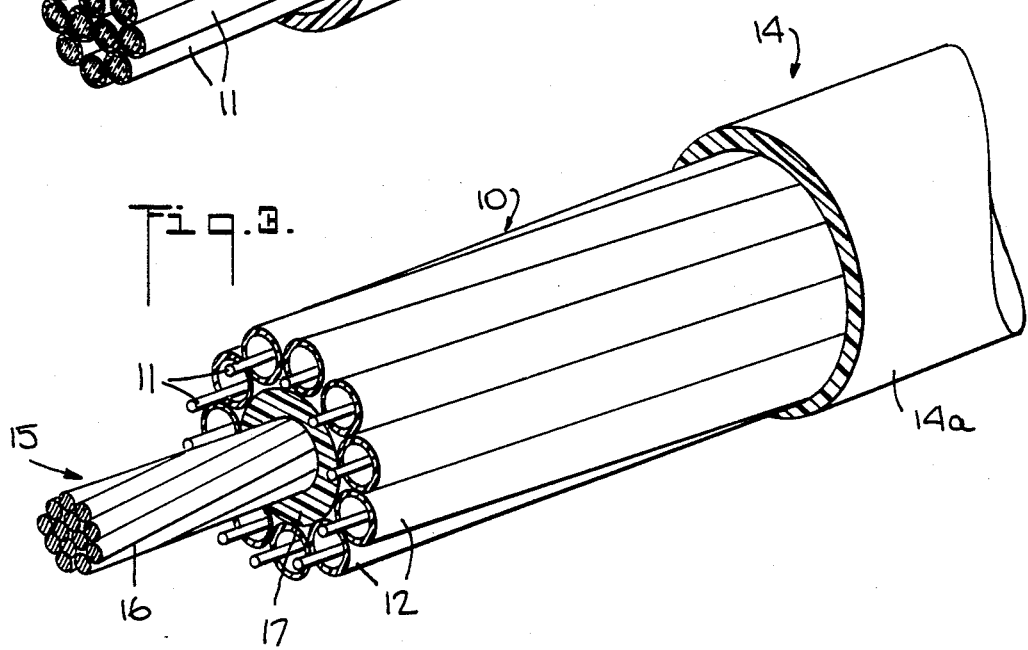

SHEATHED OPTICAL FIBER ELEMENT AND CABLE

The present invention relates to an improved unitary element including one or more optical fibers, such element being intended particularly for use with other elements of the same type, or elementary electric wires to form telecommunication cables, and to a method for the production of said unitary element.

As used herein, the expression "unitary element" means an element for the transmission of signals constituted by either a single optical fiber covered with a sheath of appropriate material or a plurality of optical fibers covered as a group by a sheath of suitable material.

The optical fiber inserted in the sheath can be bare or covered with an adhering protective layer of plastic material, such layer preferably having a very small thickness relative to the fiber diameter.

As is known, an optical fiber is an elongated element of glass or of synthetic material, of a very small diameter, of the order of from a few tenths to a few thousandths of a millimeter. Said elongated element is relatively long, e.g., of an indefinite length, and comprises a cylindrical core having a predetermined refractive index and a covering layer having a different refractive index which is smaller than the refractive index of the core.

Because of the difference between the refractive index of the material forming the core and the refractive index of the covering layer, a light beam entering at one end of the fiber with an angle of incidence sufficiently small, with respect to the axis of the fiber, is totally reflected inside the core, that is, is transmitted from one end of the fiber to the other, along the axis of the latter, even if said axis is curvilinear. By using special types of glass or synthetic materials having a low attenuation for light, the signal modulated light entering one end of the fiber is attenuated only by a negligible amount in its passage through the fiber to the exit end thereof.

However, the use of said fibers entails some difficulties of a mechanical nature, because of the low value of their tensile strength and of their ultimate elongation. It follows that, in using optical fibers in telecommunication cables, it is necessary first of all to solve the problem of limiting the magnitude of the stresses and deformations which can stress the fiber directly, for example, during the construction of the unitary element and of the cable and during the laying and service use of the latter.

In U.S. Pat. No. 3,937,559 issued on application Ser. No. 465,827, filed May 1, 1974, assigned to the assignee of this application and entitled OPTICAL FIBER CABLE AND MANUFACTURE THEREOF, a solution for the mechanical problems is proposed, and according to the proposal therein, a plurality of fibers is arranged between two films of thermoplastic material bonded together to form a single composite band. Said fibers are substantially parallel to one another, and each of them follows an undulated path of a length about 10% greater than the length of the films in which they are embedded. In this way, when the composite band is subjected to tension within the elastic limits of the films, the optical fibers are scarcely stressed.

In another prior U.S. application Ser. No. 468,765 assigned to the assignee of this application, filed May 10, 1974 and entitled OPTICAL FIBER CABLE AND MANUFACTURE THEREOF, an optical fiber is embedded in an extruded sheath and extends along the longitudinal axis of the latter. Two metal wires, having a coefficient of thermal expansion of the order of that of the optical fiber, are embedded in the same extruded sheath at an equal distance from the optical fiber. The stresses due, for example, to the cooling of the extruded material and to the cable formation or the laying operations are opposed by the metal wires.

Both of the said embodiments give very good results as long as the bending of the unitary elements, arising, for example, during winding of the element into a coil or during helical winding thereof on a central supporting core to form a cable, is effected with a large bending radius. A large bending radius is, for example, one exceeding approximately 100 mm., but, of course, such radius dimension is merely illustrative.

Unfortunately, the risk of rupture of the optical fibers exists when the unitary elements, or a cable formed with them, are subjected to flexing on a small bending radius, such as a radius smaller than 100 mm.

In fact, at the present state of the art no processes for producing unitary optical fiber elements are known which permit a perfect centering of the optical fiber with respect to the sheath, and especially when the diameter of the sheath is much greater than the diameter of the fiber. In such case, as is known to those skilled in the art, the tension or compression stress on the fibers, when the unitary element is subjected to flexing, is proportional to the distance of the optical fiber from the neutral axis of the unitary element and inversely proportional to the bending radius of the element.

Moreover, if a cable is formed by winding unitary elements having an adhering sheath on a supporting core and is bent on a mandrel having a small bending radius, the unitary element is compressed in the inner portion facing the mandrel and is stretched in the outer portion because of the fact that the friction between the element and the core on which it is wound prevents the element from sliding significantly with respect to the core, and the optical fiber or fibers contained in the unitary element are subjected to compression or tension stresses.

Therefore, the present invention has, as one object, the provision of an improved unitary element which causes the optical fiber to be subjected to smaller compression and tension stress during the bending of the unitary element itself, and at the same time, allows the optical fiber to be sufficiently independent of the sheath that it does not suffer the consequences of the adverse conditions to which the sheath is subjected. A further object of the present invention is the provision of a process able to produce such improved unitary elements with optical fibers.

In particular, the main object of the present invention is a unitary element of indefinite length, comprising either a single optical fiber individually, or a plurality of optical fibers, either with or without a protective layer, loosely enclosed in a protective sheath, such protective sheath being tubular and having an inner surface which does not adhere to said fiber or fibers and having an inner diameter substantially greater than the outer diameter of said fiber or, in the case of a plurality of fibers, greater than the diameter of a circle circumscribing the periphery thereof. According to a preferred embodiment of the invention, the ratio between the inner diameter of said sheath and the outer diameter of said optical fiber, or plurality of optical fibers, is at least 3 and, preferably, is from 5 to 10. In the preferred embodiment of the invention, said fiber (or fibers) has a length greater than the length of said tubular sheath. The sheath may be made of an elastomeric material and, preferably, is made of a thermoplastic resin such as polyethylene or polypropylene.

A further object of the invention is a process for the production of the unitary element of the invention which comprises the operations of extruding a sheath on the optical fiber or fibers, cooling the sheath and collecting the formed element, characterized in that it comprises the step of lubricating the fiber or fibers with a suitable anti-adhesive agent before the extrusion of said tubular sheath, the latter being extruded with an inner diameter, which, after cooling and at room temperature, continues to be greater than the outer diameter of the optical fiber or fibers.

A preferred embodiment of the process of the invention comprises the step of elastically elongating said tubular sheath during the passage of the unitary element through a zone of the production line, at which free relative sliding between the sheath and the fiber is permitted and the step of eliminating the obtained elastic elongation during the passage of the element through a zone of said line which does not allow said free relative sliding.

Other objects and advantages of the invention will be apparent from the following detailed description of preferred embodiments thereof, which description should be considered in conjunction with the accompanying drawing, in which FIG. 1 is a sectional, perspective view of a portion of a unitary element according to the invention and comprising a single optical fiber;

FIG. 2 is a sectional, perspective view of a portion of a unitary element of the invention comprising a plurality of optical fibers;

FIG. 3 is a sectional, perspective view of a portion of a telecommunication cable comprising a plurality of the unitary elements shown in FIG. 1.

Figure 4:
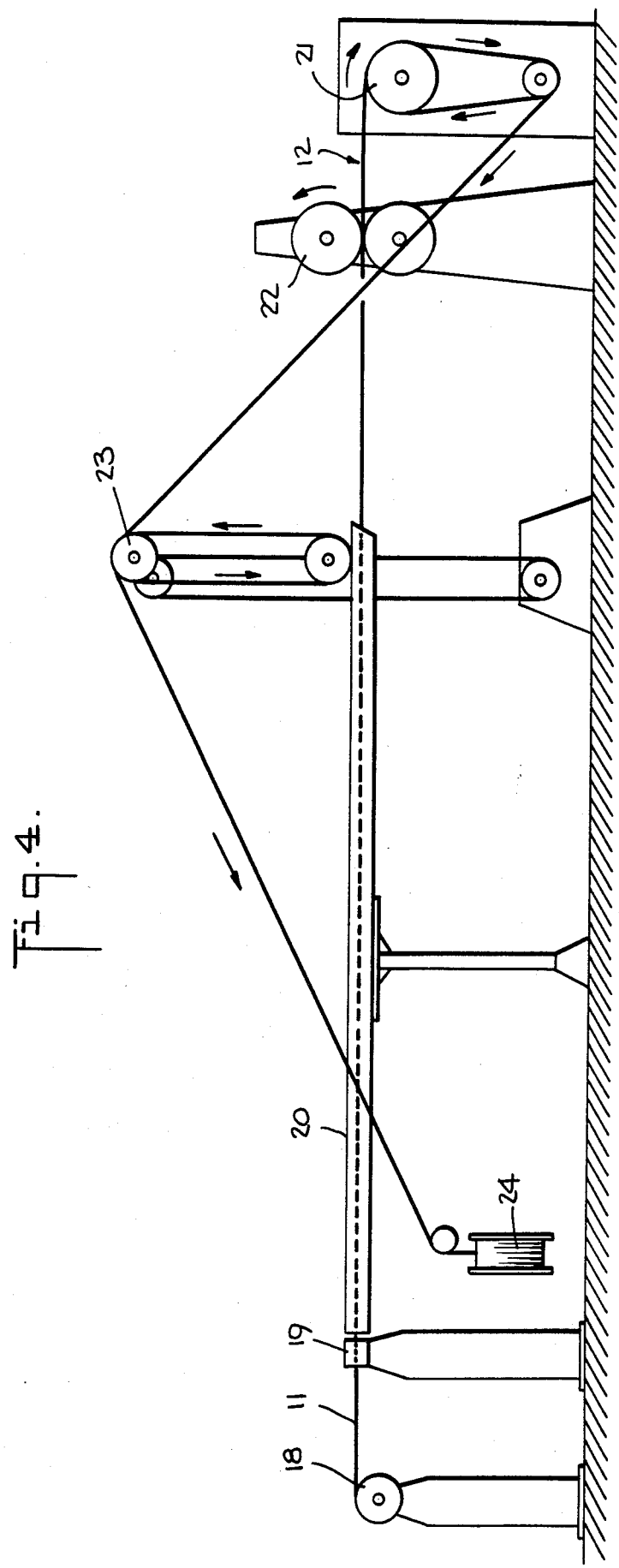
FIG. 4 is a diagrammatic, side elevation view of a production line for manufacturing a unitary element of the invention.

The unitary element 10, a portion of which is shown in FIG. 1, has an indefinite length, that is, may be of any desired length which it is practical to manufacture, and comprises a single optical fiber 11 covered by a protective layer, such as a layer of plastic, and enclosed in a tubular sheath 12 having an inner surface 13 which does not adhere to said fiber 11.

The inner diameter $\phi i$ of said tubular sheath 12 is of about 1 mm. and is greater than the outer diameter $\phi e$ of the optical fiber 11, which may be of the order of 0.15 mm., the ratio $\phi i/\phi e$ being equal to 6.66.

As shown in FIG. 2, the tubular sheath 12 could enclose, instead of only one optical fiber 11, a plurality of optical fibers 11. In this case, the inner diameter of the tubular sheath 12 is greater than the outer diameter of a circle circumscribing the periphery of said fibers. In any case, the ratio between the inner diameter of the sheath and the outer diameter of the optical fiber or of such circle is at least 3 and preferably, is from 5 to 10. Moreover, the optical fiber or fibers 11 contained in the tubular sheath 12 can have a length equal to, or greater than, the length of the tubular sheath 12.

Said tubular sheath 12 can be constituted by an appropriate material, many of which are known in the art. The preferred materials are thermoplastic resin, in particular, polyethylene and polypropylene, or it can be formed of elastomeric materials.

As mentioned hereinbefore, elements like the unitary element 10 of FIG. 1 may be used in forming telecommunication cables. FIG. 3 represents such a telecommunication cable 14, which comprises a plurality of identical unitary elements 10 each constituted by a single optical fiber 11 enclosed in the tubular sheath 12. The unitary elements 10 are helically wound on a supporting core 15 comprising a steel rope 16 covered with a soft layer 17, preferably made of cellular synthetic material. Of course, as known by those skilled in the art, the cable 14 is completed with one or more layers superimposed on the unitary element 10. Said layers are illustrated in FIG. 3 by the layer 14a, and, for example, may be appropriate tapings, protection sheaths, armoring, etc.

During the formation of the telecommunication cable 14, or during the laying thereof, it may be bent, such as around pulleys, and the cable 14 is subjected to stresses which are transmitted to each of its unitary elements 10. When the unitary element 10 is provided with a fiber 11 having a length equal to that of the tubular sheath 12, said fiber 11 tends to take a position in which, as an average, it is co-axial with the tubular sheath 12. As a consequence, each tension stress applied to the unitary element 10 results in an elongation of the sheath 12 only, whereas the fiber 11 is not stressed. The fiber 11 merely is displaced toward the inner surface 13 of the sheath 12 until it touches it under the maximum tension stress applied to the sheath 12, without being stressed itself.

If said fiber 11 has a length greater than that of its tubular sheath 12, the tension or compression stress which can be applied to the unitary element 10 without causing a stress of said fiber 11 is greater than that which could be applied to the unitary element 10 comprising a fiber 11 having a length equal to that of the sheath 12.

The unitary element 10 may be produced on the production line illustrated diagrammatically in FIG. 4. Said line comprises at least an element 18 for paying-off the fiber, an extruder or extruding press 19, a cooling tank 20, a drawing capstan 21, a brake 22, an accumulator 23 and a collecting drum 24.

The method of production according to the invention provides that one or more optical fibers 11, either with or without a protection layer and fed from the paying-off element 18 and before being covered with the sheath 12, namely, upstream and preferably in proximity of the extruder 19, is lubricated with an appropriate anti-adhesive agent, for example, a silicone oil, so that the fiber or fibers 11 cannot adhere to the inner surface 13 of the tubular sheath 12 at any point of contact with it. The sheath 12 is then extruded on the so-lubricated fiber or fibers 11 with an inner diameter $\phi i$ which, at room temperature, remains greater than the outer diameter $\phi e$ of the optical fiber or fibers 11 after having passed through the cooling tank 20.

Therefore, the unitary element 10, comprising the fiber or fibers 11 and the tubular sheath 12, exits from the extruder 19. Said unitary element 10, immediately downstream from the extruder 19, enters the cooling tank 20, through which it passes to obtain a setting of the sheath 12. According to a first embodiment, the unitary element 10 at its exiting from the cooling tank 20 is ready to be wound up on the collecting drum 24. The drum 24 is then arranged on an appropriate and known type of processing line (not shown) where the unitary element 10 is helically wound up on the supporting core 15 in a conventional way.

According to a preferred embodiment of the invention, the hereinafter described steps are carried out between the extrusion and the collection on the drum 24 to obtain a unitary element 10 in which the fiber 11 has a linear length longer than that of the sheath 12. The tubular sheath 12 is elongated elastically during the passage of the unitary element 10 through a zone of the production line, for example, the line illustrated in FIG. 4, which permits a free relative sliding between the sheath 12 and the fiber or fibers 11, and thereafter, the so-obtained elastic elongation of the sheath 12 is eliminated during the passage of said element 10 through a further zone of the line where said relative sliding is not permitted, for example, during the passage of the unitary element 10 from the drawing capstan 21 to the collecting drum 24.

Said elastic elongation of the sheath 12 can be obtained by applying a tension to the sheath 12 in the zone of the line in which the fiber or fibers 11 are free to slide with respect to said sheath 12. For example, in the line illustrated in FIG. 4, the unitary element 10, as it leaves the cooling tank 20, is gripped by the drawing capstan 21 in a way which, because of the friction between the tubular sheath 12 and the fiber 11, causes, as a practical matter, an equal advancement of the fiber 11 and of the sheath 12, when the diameter of the drawing capstan 21 is much larger than the diameter of the tubular sheath 12. A brake 22, situated upstream of the drawing capstan 21, subjects the tubular sheath 12 to tension opposite to that applied by said drawing capstan 21. Therefore, in its passage through the zone of the production line between the brake 22 and the drawing capstan 21, the sheath 12 is subjected to an elastic elongation, whereas the fiber or fibers 11 are unstretched.

When the unitary element 10 leaves the drawing capstan 21 to be wound up on the accumulator 23, a shortening of the tubular sheath 12 is caused by elastic action, because said sheath 12 is subjected to a tension smaller than that imparted to it in the zone between the brake 22 and the drawing capstan 21. Accordingly, as the unitary element 10 is wound up on the collecting drum 24, the sheath 12 will shorten and cause the fiber or fibers 11 to curve or become wavy, so that the stretched or developed length of the fiber or fibers 11 between predetermined points lengthwise of the sheath 12 will be greater than the length of the sheath 12 between such points.

It has been found that the greater length of the fiber 11 with respect to the length of the corresponding surrounding portion of the tubular sheath 12 in the production of the unitary element 10, also can be obtained by means of a thermal treatment, namely, by exploiting the high coefficient of thermal expansion of the material forming the sheath 12, in particular, when the latter is constituted by thermoplastic resin.

For example, if the temperature of the cooling tank 20 is kept sufficiently high with respect to the room temperature, the tubular sheath 12 which exits from the tank 20 and is directed towards the drawing capstan 21 is still hot and subsequently, due to its cooling in the zone of the line before the collecting drum 24, shortens by an amount which is greater than that of the fiber which has a low coefficient of thermal expansion. The effect is similar to the mechanical tensioning of the sheath 12 hereinbefore described, and results in a greater length of the fiber 11 with respect to the corresponding surrounding tubular sheath 12. In other words, according to the latter process, the elastic elongation of the sheath 12 is obtained in the tank 20 which brings the sheath to a temperature higher than the room temperature, and the shortening of the sheath 12 is obtained by cooling it at room temperature in the portion downstream of said tank 20.

If desired, both the elongation of the sheath 12 and the elimination of said elongation can be obtained by combining the application of tension and the thermal treatments.

The unitary element 10 with a fiber or fibers 11 longer than the sheath 12 can be collected on the drum 24 and then wound on the supporting core 15 in a conventional manner to form a telecommunication cable, for example, the cable 14 illustrated in FIG. 3.

Although preferred embodiments of the present invention have been described and illustrated, it will be understood by those skilled in the art that various modifications may be made without departing from the principles of the invention.

What is claimed is:

1. A unitary, signal modulated light transmitting, optical fiber element for telecommunication cables comprising a flexible, tubular non-metallic sheath and at least one light transmitting, optical fiber loosely received within and unsecured throughout its length and its ends to said sheath so that it is free to move both longitudinally as a whole and transversely to said sheath and adopt a shape providing minimum stress thereon, each said fiber having a solid central core of light transmitting material coated with a layer of solid material having an index of refraction smaller than the index of refraction of said core and said fiber having a minimum bending radius whereby bending of said fiber in a smaller radius will cause rupture of the fiber, said sheath having an empty inner longitudinal bore in which said fiber is received which is unobstructed for a minimum diameter larger than the diameter of a circle required to circumscribe all fibers within said bore and the unstretched, linear length of all said fibers within said bore being greater than the unstretched, linear length of said bore therearound but less than a linear length which will cause said fibers to bend to a radius less than said minimum radius when within said bore, whereby said fibers follow undulate paths within the sheath and contact the inner wall thereof and when said element is subjected to bending or elongation stresses the fiber or fibers are free to move transversely of said bore and said sheath can elongate without increasing the length of the fiber or fibers with respect to said linear length thereof thereby increasing the stresses to which said element may be subjected without rupturing the fiber or fibers.

2. A unitary optical fiber element as set forth in claim 1, wherein said sheath is made from a resin.

3. A unitary optical fiber element as set forth in claim 2, wherein said resin is thermoplastic.

4. A unitary optical fiber element as set forth in claim 2, wherein said resin is elastomeric.

5. A unitary optical fiber element as set forth in claim 2, wherein said resin is a resin selected from the group consisting of polypropylene and polyethylene.

6. A telecommunication cable comprising a plurality of the unitary elements set forth in claim 1 disposed in side-by-side relation.

7. A telecommunication cable as set forth in claim 6, further comprising a central core and wherein said unitary elements are helically wound around said core.

8. An element as set forth in claim 1, wherein said minimum diameter of said bore is from five to ten times the diameter of said circle.

9. An element as set forth in claim 1, wherein there are a plurality of said fibers within said sheath.

10. A telecommunication cable comprising a plurality of the unitary elements set forth in claim 9 disposed in side-by-side relation.

11. A telecommunication cable as set forth in claim 10, further comprising a central core and wherein said unitary elements are helically wound around said core.

12. An element as set forth in claim 1 wherein said minimum diameter of said bore is at least three times the diameter of said circle.

13. A unitary, signal modulated light transmitting, optical fiber element for telecommunication cables comprising a flexible, tubular, non-metallic sheath and a plurality of light transmitting, optical fibers loosely received within and unsecured throughout their lengths and at their ends to said sheath so that they are free to move both longitudinally as a whole and transversely to said sheath and adopt a shape providing minimum stress thereon, each said fiber having a solid central core of light transmitting material coated with a layer of solid material having an index of refraction smaller than the index of refraction of said core and said fiber having a minimum bending radius whereby bending of said fiber in a smaller radius will cause rupture of the fiber, said sheath having an empty inner longitudinal bore in which said fibers are received which is unobstructed for a minimum diameter larger than the diameter of a circle required to circumscribe all fibers within said bore and the unstretched, linear length of all said fibers within said bore being greater than the unstretched, linear length of said bore therearound but less than a linear length which will cause said fibers to bend to a radius less than said minimum radius when within said bore, whereby said fibers follow undulate paths within the sheath and contact the inner wall thereof and when said element is subjected to bending or elongation stresses the fibers are free to move transversely of said bore and said sheath can elongate without increasing the length of the fibers with respect to said linear length thereof thereby increasing the stresses to which said element may be subjected without rupturing the fibers.

* * * * *